UNITED STATES PATENT OFFICE.

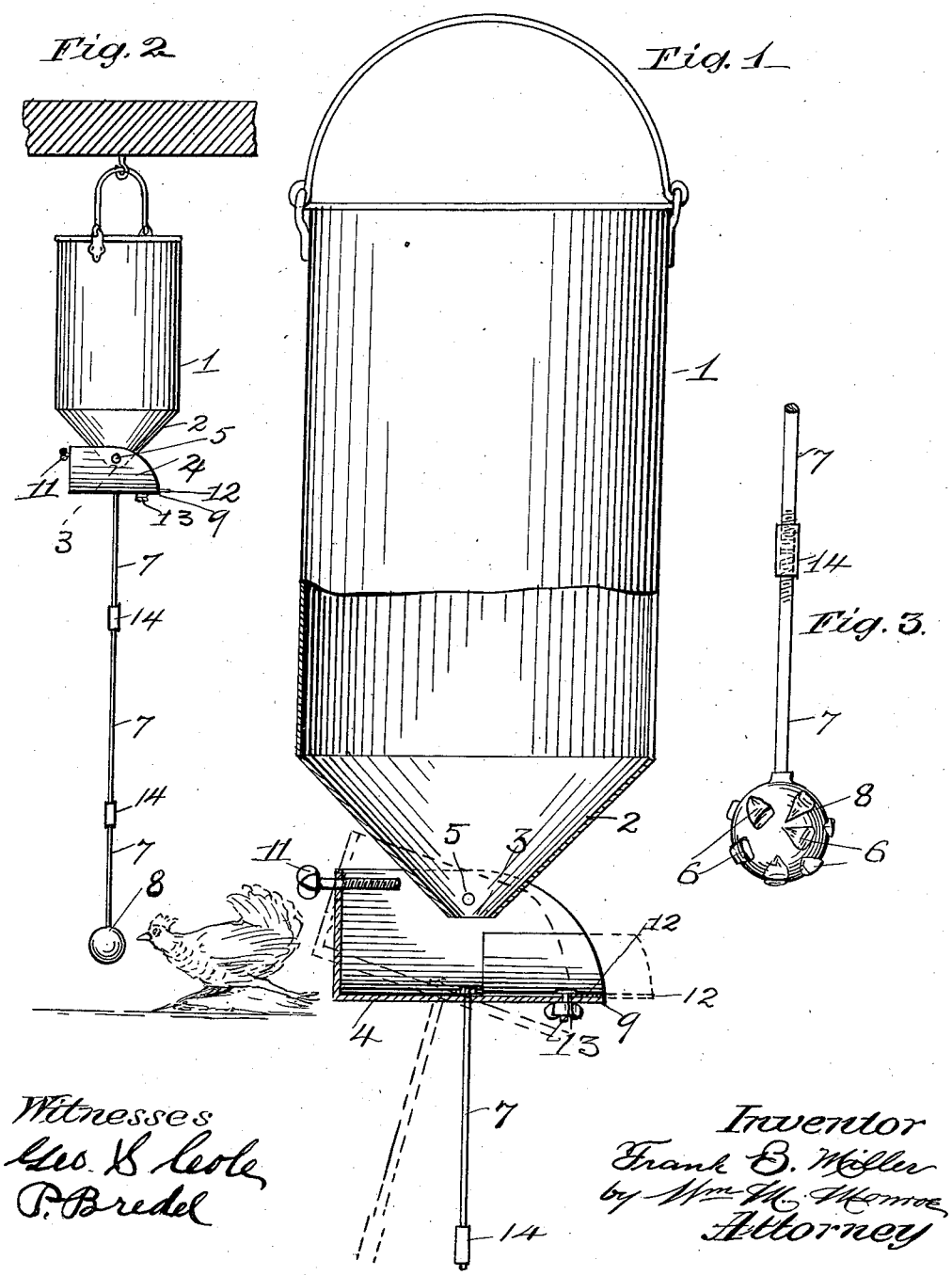

FRANK B. MILLER, OF NORWALK, OHIO.

POULTRY-FEEDER.

1,023,325. Specification of Letters Patent. Patented Apr. 16, 1912.

Application filed October 21, 1911. Serial No. 655,931.

*To all whom it may concern:*

Be it known that I, FRANK B. MILLER, a citizen of the United States, and resident of Norwalk, in the county of Huron and State of Ohio, have invented certain new and useful Improvements in Poultry-Feeders, of which I hereby declare the following to be a full, clear, and exact description, such as will enable others skilled in the art to which it appertains to make and use the same.

The objects of the invention are to provide an improved form of automatically acting poultry feeding device, so arranged that it will be operated to distribute the feed a little at a time, and hence prevent the poultry from becoming over-fed and also designed to provide the poultry with the necessary exercise in the act of obtaining their food which will keep them in good condition, the exercise being especially desirable for them when confined within the coop in winter.

The invention comprises a feeding device operated by the poultry and consists of an elevated receptacle which may be suspended from the ceiling of the coop. Pivoted upon the lower end of this receptacle is a scoop shaped receiving device and suspended from the receiving device is a weighted rod which can be swung by the poultry and serves as a pendulum to operate the tilting scoop.

The invention further consists in the combination and arrangement of parts and construction of details hereinafter described, shown in the accompanying drawings and specifically pointed out in the claims.

In the accompanying drawings Figure 1 is a vertical section through the scoop and receptacle showing its pivotal support and adjusting means for the various parts; Fig. 2 is an elevation of the complete device on a smaller scale showing the pendulum rod suspended from the scoop; Fig. 3 is an enlarged view of the lower end of the pendulum rod showing a weight or balance attached thereto, upon which artificially constructed grains of corn are shown which the poultry will peck at when hungry to swing the pendulum and scoop.

In these figures 1 is a receptacle which is provided with a tapered lower extremity 2 having a discharge opening 3 at the bottom. Pivoted underneath this opening is a scoop 4 which is balanced upon its pivotal support 5 so as to normally remain in a horizontal position, the feed falling from the opening above will pile up upon the bottom of the scoop.

7 is a vertical rod centrally secured to the lower side of the scoop and is preferably provided at the lower end with a ball or enlargement 8 on which may be attached imitation grains of corn or feed 6 to attract the poultry. The rod serves as a pendulum to swing the scoop when its balance is disturbed by poultry pecking at the grains of corn and when the scoop is tilted on its pivot some of the feed will spill over the open edge at 9 and will be distributed about the ground near the poultry so that they can easily get it.

The amount of feed which the poultry can obtain upon one swinging impulse of the pendulum can be controlled by means of a set screw 11 adapted to strike against the lower end of the receptacle and thus limit the movement of the scoop. It can also be controlled by means of the inner plate or movable edge 12 of the scoop which is adjustably and slidably secured upon the floor or sides of the scoop by means of thumb screw 13. By the employment of these adjusting means the amount of movement in a pendulum necessary to spill out the grain can be closely controlled and the pendulum rod itself can be made in several sections adjustably secured together by means of couplings 14, 14, so that the amount of energy required to operate the pendulum can be varied with the length of the rod, thus giving the poultry as much exercise in operating the pendulum as may be necessary, and by shortening the pendulum rod by removing some of the sections the pendulum and scoop can be worked easily by young chickens.

Slight modifications in structure can be made without departing from the spirit of the invention or scope of the claims.

Having described the invention what I claim as new and desire to secure by Letters Patent is:

1. The combination, in a poultry feeder, having a discharge opening, a scoop pivoted underneath said opening, and tiltable on its pivot bearings, said scoop having a lateral discharge opening, a plate slidably and adjustably mounted upon the floor of the scoop and adapted to project beyond the edge thereof, and means for tilting the scoop operable by said poultry from a position underneath said scoop.

2. In a poultry feeder, in combination, a receptacle having a discharge opening in its lower end, a balanced scoop pivoted underneath said opening, said scoop having a discharge opening, a plate slidingly and adjustably mounted upon the floor of the scoop, means for limiting the swinging movement of the scoop, and a depending rod attached to said scoop at its upper end, said rod swinging with said scoop and operable by said poultry.

In testimony whereof, I hereunto set my hand this 4" day of October, 1911.

FRANK B. MILLER.

In presence of—
WM. M. MONROE,
GEO. S. COLE.

Copies of this patent may be obtained for five cents each, by addressing the "Commissioner of Patents, Washington, D. C."